US011224044B1

(12) United States Patent
Hu et al.

(10) Patent No.: US 11,224,044 B1
(45) Date of Patent: Jan. 11, 2022

(54) PARTIAL SPECTRUM EVACUATION IN CITIZENS BROADBAND RADIO SERVICE (CBRS) NETWORKS

(71) Applicant: NOKIA TECHNOLOGIES OY, Espoo (FI)

(72) Inventors: Lan Hu, Palatine, IL (US); Navin Hathiramani, Coppell, TX (US); Roy Yang, Buffalo Grove, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/949,798

(22) Filed: Nov. 13, 2020

(51) Int. Cl.
*H04W 72/04* (2009.01)
*H04W 36/00* (2009.01)

(52) U.S. Cl.
CPC ...... *H04W 72/0486* (2013.01); *H04W 36/0072* (2013.01); *H04W 72/0453* (2013.01)

(58) Field of Classification Search
CPC ............... H04W 72/04; H04W 72/044; H04W 72/0476; H04W 72/0473; H04W 72/0453; H04W 72/0486; H04W 72/0493; H04W 72/06; H04W 72/082; H04W 72/085; H04W 72/087; H04W 36/0072
See application file for complete search history.

(56) References Cited

U.S. PATENT DOCUMENTS

| 8,892,113 | B2 | 11/2014 | Ratasuk et al. | |
|---|---|---|---|---|
| 10,368,351 | B1* | 7/2019 | Syed | H04W 52/365 |
| 11,026,205 | B2* | 6/2021 | Hmimy | H04W 16/14 |
| 2016/0270089 | A1* | 9/2016 | Olfat | H04L 5/0062 |
| 2021/0014693 | A1* | 1/2021 | Syed | H04W 16/14 |
| 2021/0153029 | A1* | 5/2021 | Mueck | H04W 16/14 |

OTHER PUBLICATIONS

Ullah, Abid; "Mechanisms for Enhancing Spectrum Utilization in a Spectrum Access System"; Dissertation submitted to the Faculty of the Virginia Polytechnic Institute and State University; Dec. 13, 2016; 95 pages.
Ericsson; "CBRS AAS Antenna Pattern Negotiation"; Wireless Innovation Forum Document No. WINFF-19-I-00130-V1.00; Sep. 27, 2019; 7 pages.

* cited by examiner

Primary Examiner — Siu M Lee
(74) Attorney, Agent, or Firm — Brake Hughes Bellermann LLP

(57) ABSTRACT

Various techniques are provided for spectrum allocation. A method can include receiving a message including a first maximum power setting, a second maximum power setting, and a spatial range associated with the second maximum power setting, transmitting at least one first beam within the first maximum power in a spatial range excluding the spatial range associated with the second maximum power setting, and transmitting at least one second beam within the second maximum power in the spatial range associated with the second maximum power setting.

28 Claims, 11 Drawing Sheets

PARTIAL SPECTRUM EVACUATION IN CITIZENS BROADBAND RADIO SERVICE (CBRS) NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

In a general aspect, a device, a system, a non-transitory computer-readable medium (having stored thereon computer executable program code which can be executed on a computer system), and/or a method can perform a process with a method including receiving, by a base station from a network device, a message including a first maximum power setting, a second maximum power setting, and a spatial range associated with the second maximum power setting, transmitting, by the base station, at least one first beam within the first maximum power in a spatial range excluding the spatial range associated with the second maximum power setting, and transmitting, by the base station, at least one second beam within the second maximum power in the spatial range associated with the second maximum power setting.

Implementations can include one or more of the following features. For example, the spatial range associated with the second maximum power setting can be an interfering spatial range and the spatial range excluding the second maximum power setting is a non-interfering spatial range. The method can further include communicating, by the base station, a spectrum request to the network device. The method can further include determining whether the second maximum power setting is less than a minimum power setting; and in response to determining the second maximum power setting is less than the minimum power setting, muting the at least one second beam within the spatial range associated with the second maximum power setting. The method of Example 4, wherein the message can be a first message, the method can further include receiving a second message including the first maximum power setting, and an additional maximum power setting for the spatial range associated with the second maximum power setting, determining whether the additional maximum power setting is greater than a minimum power setting; and in response to determining the additional maximum power setting is greater than the minimum power setting, unmuting the at least one second beam, and transmitting the at least one second beam within the additional maximum power in the spatial range associated with the second maximum power setting.

The first maximum power setting can be greater than the second power setting. The spatial range associated with the second maximum power setting can include two or more spatial ranges in a full steering range. The at least one first beam and the at least one second beam can be transmitted in at least one of a shared access frequency band, such as 6 GHz with Automated Frequency Coordination (AFC), and Citizens Broadband Radio Service (CBRS). The network device can be a frequency allocation arbitrator or coordinator device. The spatial range associated with the second maximum power setting can be associated with a signal interference with a protected device. The protected device can have a higher priority than the first base station. The protected device can be at least one of a base station, a fixed microwave station, a radio astronomy station and a fixed satellite station (FSS) base station. The second maximum power setting can be configured to keep the signal interference below a threshold that does not cause interference to the protected device. The second maximum power setting can include two or more power settings, and the spatial range associated with the second maximum power setting includes two or more spatial ranges. The spatial range associated with the second maximum power setting can be no more than a full steering range. The receiving of the message can occur one of during active use of a channel, during inquiry on available channels, or during request of usage of the channel.

In another general aspect, a device, a system, a non-transitory computer-readable medium (having stored thereon computer executable program code which can be executed on a computer system), and/or a method can perform a process with a method including determining, by a network device, a first power maximum power setting for a first base station, determining, by the network device, a protection or exclusion area for a protected device, determining, by the network device, whether an aggregate signal interference associated with the protected device is greater than an interference budget, and in response to determining the aggregate signal interference associated with the protected device is greater than the interference budget determining, by the network device, a spatial range associated with a signal interference between the base station and the protected device, determining, by the network device, a second maximum power setting for the base station, the second maximum power setting reducing the signal interference between the base station and the protected device, and communicating, by the network device, to the base station, a message including the first maximum power setting, the second maximum power setting, and the spatial range.

Implementations can include one or more of the following features. For example, the method can further include in response to determining the aggregate signal interference associated with the protected device is less than the interference budget, communicating, by the network device, to the base station, a message including the first maximum power setting, the second power setting and a spatial range associated with the second power setting. The method can further include receiving, by the network device, a message including a spectrum request from the base station, wherein the receiving of the message occurs one of during active use of a channel, during inquiry on available channels, or during request of usage of the channel. The first maximum power setting can be greater than the second power setting. The spatial range can include two or more spatial ranges in a full steering range.

The second maximum power setting can include two or more power settings and the spatial range includes two or more spatial ranges. The network device can be a frequency allocation arbitrator or coordinator device. The protected device can have a higher priority than the base station. The second maximum power setting can be configured to keep the signal interference below a threshold. The threshold can be associated aggregate interference associated with all base stations within a range of the protected device. The spatial range can be no more than a full steering range. The method can be performed in a fixed time window.

In another general aspect, a device, a system, a non-transitory computer-readable medium (having stored thereon computer executable program code which can be executed on a computer system), and/or a method can perform a process with a method including determining, by a network device, a first spatial range for a first base station that interferes with a protected device, determining, by the network device, a second spatial range for a second base station that interferes with the protected device, determining, by the network device, a first maximum power setting for the first base station in a spatial range that excludes the first spatial range, determining, by the network device, a second maximum power setting for the second base station in the spatial range that excludes the second spatial range, determining, by the network device, an aggregated interference signal associated with the protected device, in response to determining the aggregated interference signal associated with the protected device is greater than an interference budget determining, by the network device, a third maximum power setting for the first base station in the first spatial range, the third maximum power setting reducing the signal interference associated with the protected device and determining, by the network device, a fourth maximum power setting for the second base station in the first spatial range, the fourth maximum power setting reducing the signal interference associated with the protected device, communicating, by the network device, to the first base station, a message including the first maximum power setting, the third maximum power setting, and the first spatial range, and communicating, by the network device, to the second base station, a message including the second maximum power setting, the fourth maximum power setting, and the second spatial range.

Implementations can include one or more of the following features. For example, the method can further include in response to determining the aggregate signal interference associated with the protected device is less than the interference budget, communicating, by the network device, to the base station, a message including the first maximum power setting. The method can further include receiving, by the network device, a message including a spectrum request from the base station, wherein the receiving of the message occurs one of during active use of a channel, during inquiry on available channels, or during request of usage of the channel. The first maximum power setting can be greater than the second power setting. The spatial range can include two or more spatial ranges in a full steering range. The second maximum power setting can include two or more power settings and the spatial range includes two or more spatial ranges. The first base station and the second base station can operate in at least one of shared frequency bands, such as 6 GHz with Automated Frequency Coordination (AFC), and Citizens Broadband Radio Service (CBRS). The network device can be a frequency allocation arbitrator or coordinator device. The protected device can have a higher priority than the base station. The second maximum power setting can be configured to keep the signal interference below a threshold. The threshold can be associated aggregate interference associated with all base stations within a range of the protected device. The spatial range can be no more than a full steering range. The method can be performed in a fixed time window.

The details of one or more examples of embodiments are set forth in the accompanying drawings and the description below. Other features will be apparent from the description and drawings, and from the claims.

DETAILED DESCRIPTION

Figure 1:
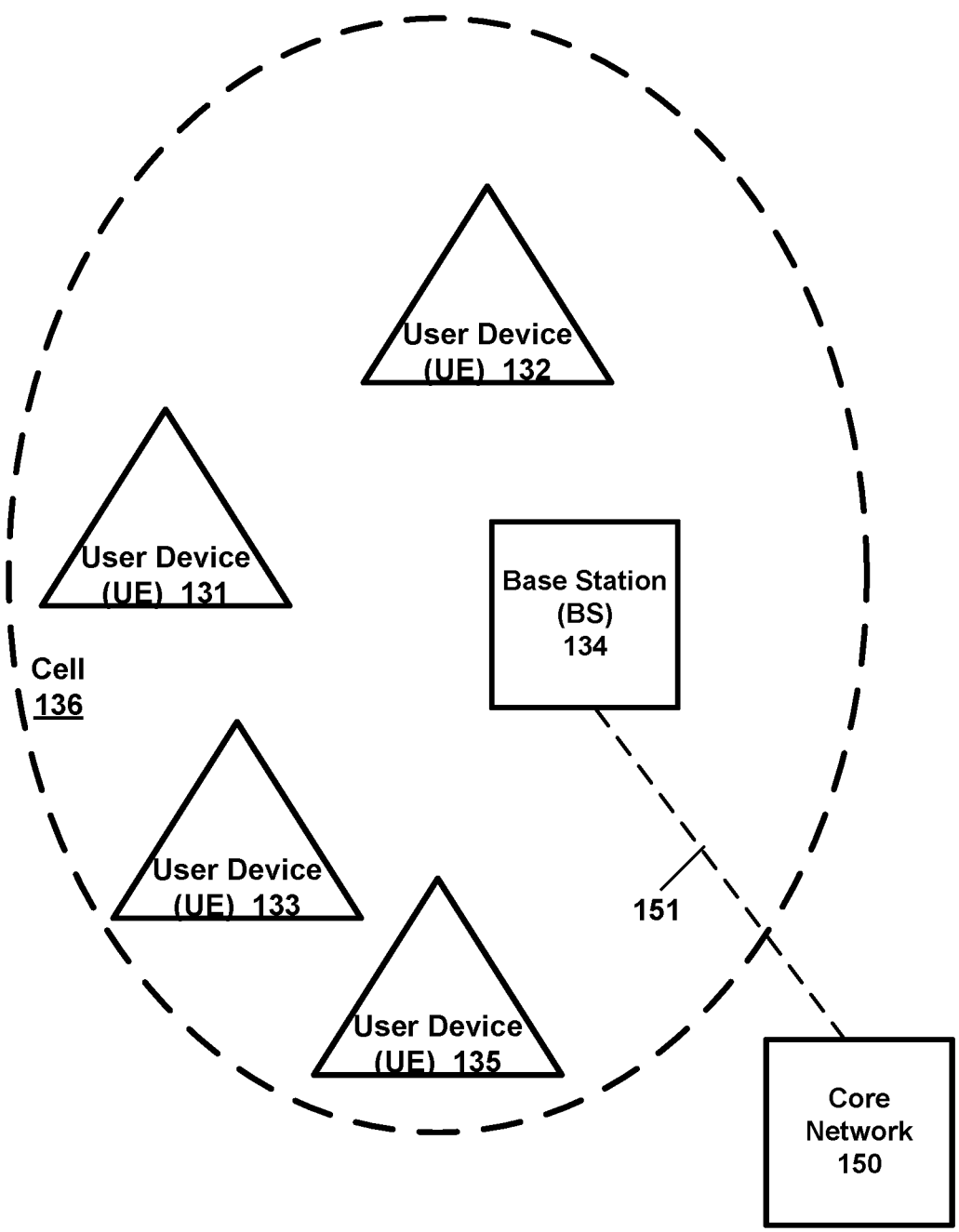
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e) Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, sending data to, and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MIME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

In a connected mode (e.g., RRC-Connected) with respect to a cell (or gNB or DU), the UE is connected to a BS/gNB, and the UE may receive data, and may send data (based on receiving an uplink grant). Also, in a connected mode, UE mobility may be controlled by the gNB or network.

The United States Federal Communications Commission (FCC) has approved the use of Citizens Broadband Radio Service (CBRS) for shared wireless access (Band 48 at 3.5 GHz). CBRS can use a three-tiered access mechanism with an authorization framework to accommodate the shared federal and non-federal use of the frequency band. A Spectrum Access System (SAS) can work as a frequency band arbitrator to coordinate the access and operations between the Incumbent Access (IA) users (e.g., authorized federal users), Priority Access Licensee (PAL) users (e.g., service providers that are licensed from the regional governments) and the General Access (GAA) users (e.g., small offices). In the three-tiered access scheme, the IA users can receive protection against harmful interference from PAL and GAA users. PAL users must protect and accept interference from IA users and receive protection against the interferences from the GAA users. GAA users must accept interference.

Should a higher tier user (e.g., a protected user) require the shared spectrum, the lower tiered user needs to reduce (e.g., attenuate) transmitted power or even stop transmission to avoid causing interference to the higher tiered users. This process can be referred to as spectrum evacuation. The SAS can determine which lower tiered users are to reduce power or stop transmission based on the SASs estimation of the combined or aggregate interference levels to the higher tiered users. A Citizens Broadband Radio Service Device (CBSD) can be a base station that supports the CBRS spectrum authorization framework.

In CBRS networks, one category of IA users can be a fixed satellite station (FSS). An FSS can be a protected device. An FSS can have a known geographical location and can be transmitting and receiving signals in a certain frequency band. There are two classes of CBSDs. Category A can include a CBSD with a nominal maximum Equivalent Isotopically Radiated Power (EIRP) of 30 dBm/10 MHz. Category B can include a CBSD with a maximum EIRP of 47 dBm/10 MHz. When the CBSD is located in the vicinity of an FSS, in order not to interfere with the FSS operation, CBSD may not be able to transmit at the nominal max power. The SAS server can be responsible for calculating the max EIRP allowed per CBSD in a time window (Coordinated Periodic Activates among SASes sometimes known as a CPAS window) to ensure the combined signals from all CBSDs is below the maximum allowed interference level of the FSS, also known as the interference budget of the FSS.

The max EIRP value from SAS server can be applied by the CBSD to all directions in its coverage area. In other words, when a CBSD lowers its EIRP, the coverage area associated with the CBSD can shrink uniformly, resulting degradation of service for users in all directions. Similarly, when the max EIRP allowed is zero, the CBSD shuts down, and all users lose service in that particular frequency band. For example, in CBRS network, the shared spectrum is managed by the Spectrum Access System (SAS). A Citizen Broadband Radio Service Device (CBSD) can send a Heartbeat Request message to request authorization to transmit. The SAS can grant the usage of the spectrum for a certain period of time defined by transmitExpireTime in the Heartbeat Response Message. When the shared spectrum is needed by a higher tiered user (e.g., the IA) the SAS can estimate the interference levels of each CBSD towards the IA.

If the estimated interference fails a criterion (e.g., exceeds a threshold, the SAS can deny the transmission request for the CBSD by setting the transmitExpireTime field to a value that will result in a timeout. At the designated time, the CBSD may stop transmission and evacuate the spectrum (e.g., after the transmitExpireTime expires). The CBSD's radio transmission may fall into one of the two states. The first state can be transmitting when the transmitExpireTime has not expired. The second state can be ceasing radio transmission after transmitExpireTime has expired. When the CBSD stops transmission, mobile users who were receiving cellular services from the CBSD can experience service interruption.

This degradation of service can be less than optimal. The FSS may be geographically located in a certain spatial direction from the CBSD. Therefore, suppressing the interference by reducing the transmit power of the CBSD only in that particular spatial direction may be sufficient. As a result, the users outside this spatial direction can continue to be serviced with minimal to no interruption. This directional information can be referred to as a spatial range. A special range can be (or can include) the angular range that can define the spatial subspace that a CBSD can operate in. The special range can be (or can typically be) bounded by a pair of (or can include the) angles in the azimuth and/or elevation directions.

Example implementations include a method to perform max EIRP control in the spatial domain in CBRS networks where the CBSD lowers the transmit power within a spatial range specified by the SAS while transmitting at a higher power outside the spatial range. For example, the Spectrum Access System (SAS) server can be configured to estimate the spatial range that a CBSD may cause interference to the FSS according to the geographical locations of the CBSD, FSS and the coverage area of the FSS. This can separate the CBSD full steering range into interfering spatial ranges and non-interfering spatial ranges. The estimation is done for the CBSDs in the vicinity of the FSS.

Then, the SAS can determine the max EIRP for each CBSD within the FSS-interfering spatial range based on the combined interference levels to the FSS. Determine the max EIRP for each CBSD outside the spatial range based on the combined interference to other CBSDs. The SAS can further provide an operational parameter for a grant to the CBSD which contains a set of pairs of maxEirpradiation/spatial range. The CBSD based on the received operational parameter to set the max Eirp for the different beams in the specified spatial ranges. Further, for any CBSD, if the max EIRP required by SAS is below its minimum transmit power, the CBSD may be configured to mute its radiation envelope within the interfering spatial range.

Example implementations can leverage the beamforming capabilities of the array antennas in a base station (e.g., the CBSD) by reducing the max EIRP only in the spatial ranges that cause interference to a protected device (e.g., the FSS) and continuing to serve the users at a higher EIRP in the non-interfering spatial directions. In other words, example implementations can provide a technique for precise coverage shaping and/or interference shaping.

Example implementations can add an additional dimension of freedom (e.g., spatial domain) to the existing art during spectrum evacuation procedure. For example, at least one implementation can divide the base station steering range into spatial ranges that interfere with the protected device (or some other incumbents) and spatial ranges that do not interfere with the protected device. The max EIRP can be lower within one or more set of interfering spatial ranges bounded by a pair of angles in azimuth and or elevation directions. When the max EIRP allowed in a spatial range is lower than the minimum transmit power of a base station, the base station can be configured to mute the beams in that range. At the next SAS grant cycle, if the newly received max EIRP is higher than the minimum transmit power, a spatial range that was previously muted by the base station can be unmuted. In the non-interfering spatial ranges, the base station can transmit at a higher max EIRP power within its steering range.

Figure 2A:
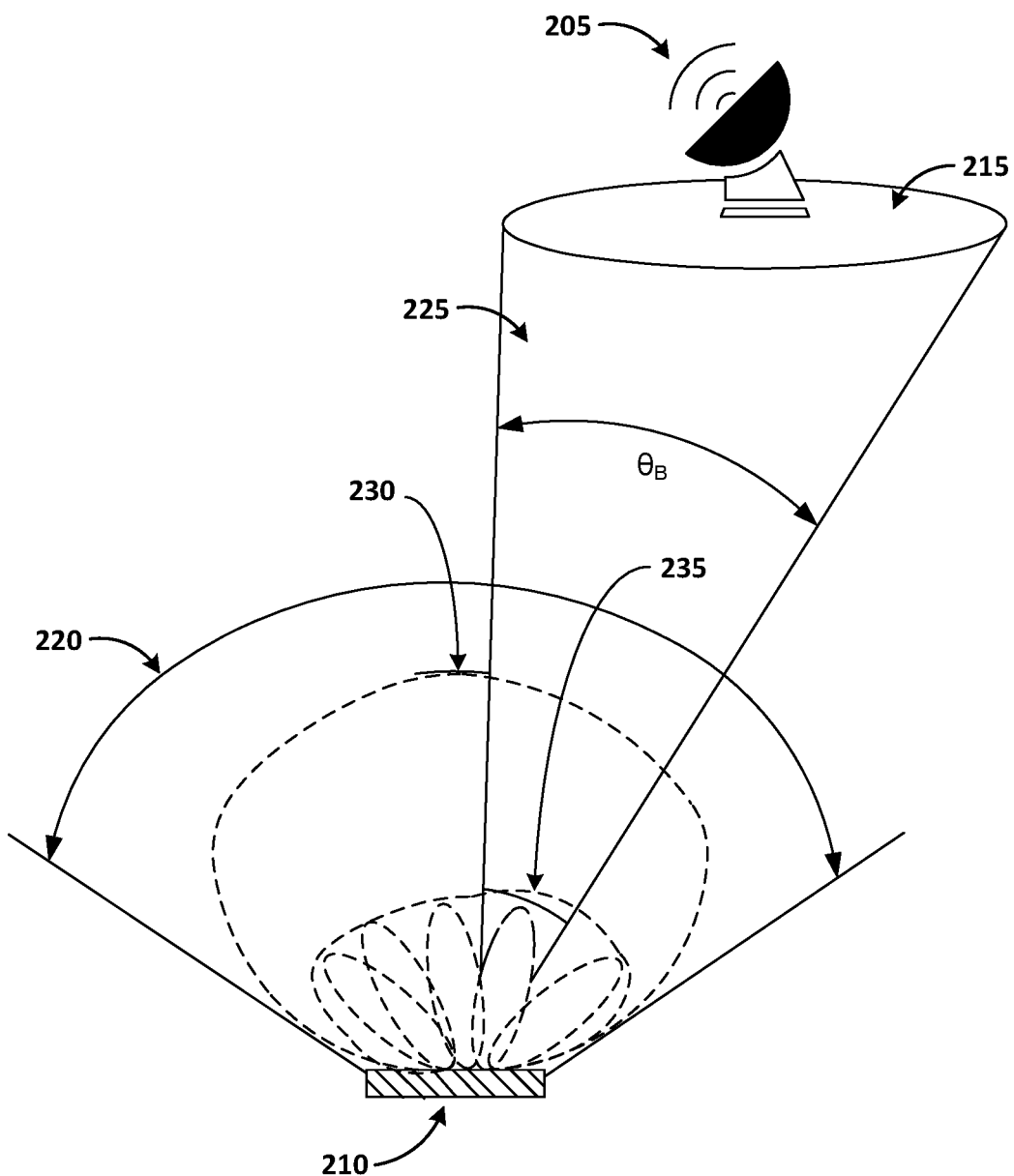
FIG. 2A is an illustration of a beam coverage area.
Figure 2B:
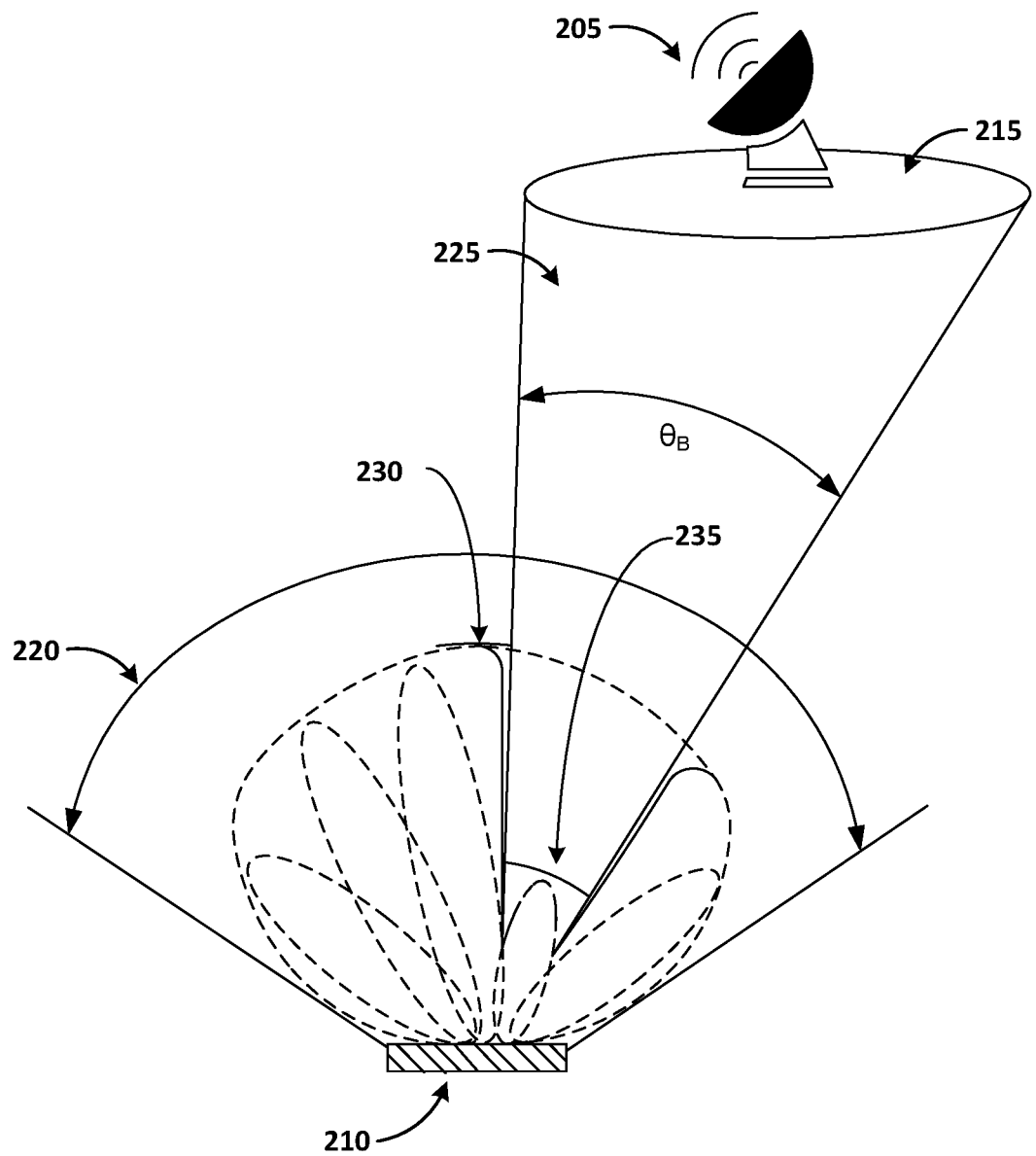
FIG. 2B is an illustration of a beam coverage area with maximum power control in a spatial range according to at least one example embodiment.

FIG. 2A is an illustration of a beam coverage area. FIG. 2B is an illustration of a beam coverage area with max power control in a spatial range according to at least one example embodiment. As shown in FIGS. 2A and 2B, the beam coverage area includes a protected device 205 and a base station 210. For example, the protected device 205 can be a base station, an FSS, a military radar, and/or the like and the base station 210 can be a CBSD. The protected device 205 can have a coverage area 215. The base station 210 can have a steering range 220. The steering range 220 can be a full steering range.

The base station 210 (and other base stations not shown) can be interfering with the protected device 205. For example, spatial range 225 can be the interfering spatial range that has an angle $\theta_B$. The base station 210 can be assigned a max EIRP level 230 (sometimes referred to herein as $P_A$) at which a signal (e.g., associated with at least one beam) generated by the base station 210 interferes with the protected device 205. Therefore, the base station 210 can be assigned a max EIRP level 235 (sometimes referred to herein as $P_B$) at which a signal generated by the base station 210 does not interfere with the protected device 205.

FIG. 2A illustrates the base station 210 having reduced or attenuated signal power such that all, or substantially all, of the signals in the steering range 220 are generated at the max EIRP level 235. By contrast, FIG. 2B illustrates the base station 210 having reduced or attenuated signal power such that the signals in the spatial range 225 are generated at the max EIRP level 235, whereas the signals in the remainder of the steering range 220 (not including the spatial range 225) are generated at the max EIRP level 230. Therefore, the spatial range 225 as illustrated in FIG. 2B can sometimes be referred to as a spatial range with EIRP control. Although FIG. 2B illustrates a single spatial range with EIRP control, a plurality (e.g., two or more) spatial ranges with EIRP control can exist. Each of the spatial ranges with EIRP control can have a max EIRP level that is the same as or different from the max EIRP level of other spatial ranges with EIRP control.

In an example implementation, a method can perform max EIRP control in the spatial domain in CBRS networks where the CBSD reduces transmit power within an interfering spatial range (e.g., spatial range 225) specified by the SAS, while continuing to transmit at a higher power in the non-interfering spatial range. For example, in an example implementation the CBSD's full steering range can be divided into subranges that interfere with the FSS (e.g., spatial range 225) and subranges that do not interfere with the FSS. The interfering spatial range, denoted as OB in FIGS. 2A and 2B, can be determined by the geographical locations of CBSD (e.g., base station 210), FSS (e.g., protected device 205) and an FSS' coverage area (215). Further, the max EIRP can be split into different levels according to the type of the spatial ranges. In FIG. 2B, the interfering spatial range (e.g., spatial range 225) uses one level of max EIRP (e.g., $P_B$). In the non-interfering spatial range, another level of max EIRP is used (e.g., $P_A$), where $P_A >= P_B$. $P_B$ can be chosen by the SAS such that the aggregate signal interference to the FSS (e.g., protected device 205) meets some criterion (e.g., is kept under a threshold).

Figure 3:
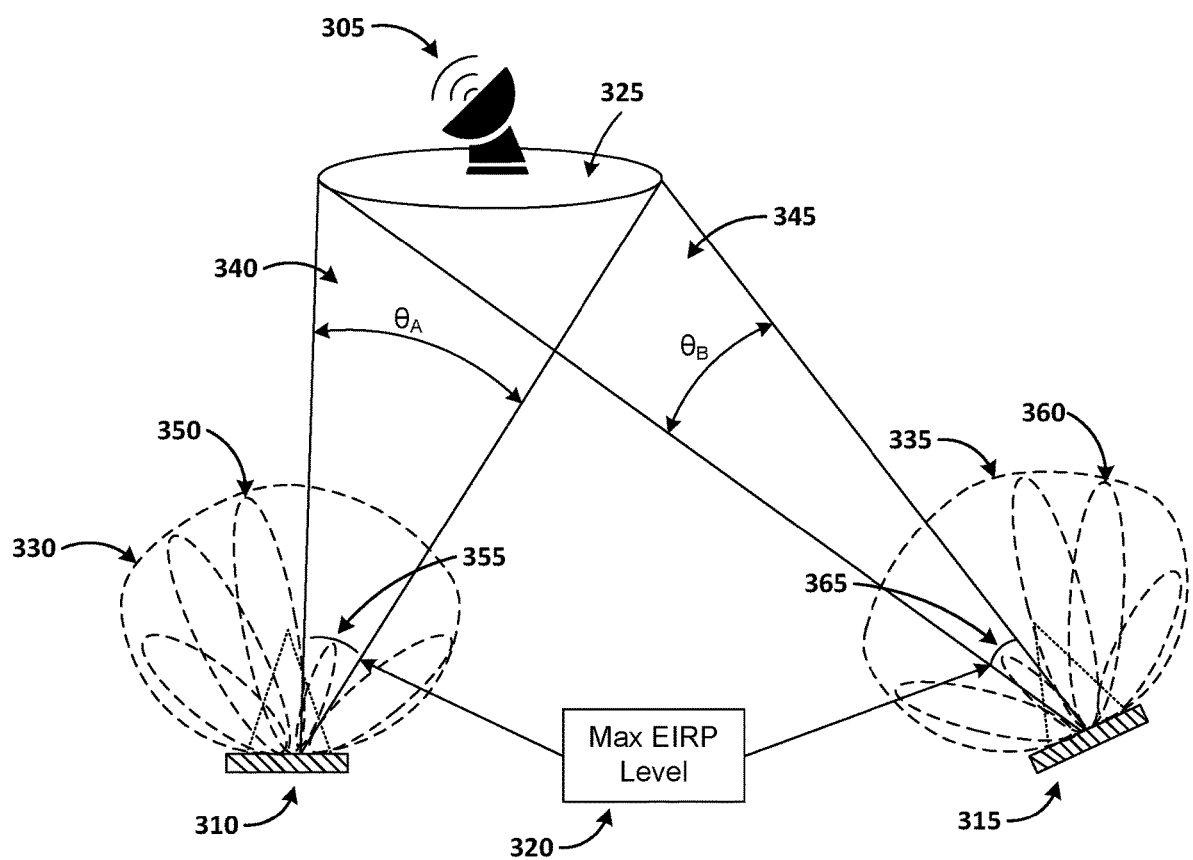
FIG. 3 is an illustration of a beam coverage area with maximum power control in a spatial range according to at least one example embodiment.

For example, the SAS (e.g., a SAS server) can be configured to estimate the spatial range that a CBSD may cause interference to the FSS according to the geographical locations of the CBSD, FSS and the coverage area of the FSS. The interference can be estimated for all the CBSDs in the vicinity of the FSS. The SAS can be configured to determine the max EIRP for the CBSD within its interfering spatial range and determine the max EIRP for the CBSD outside the spatial range based on the interference to other CBSDs. The SAS can be configured to provide an operational parameter for a grant to the CBSD which contains a set of pairs of maxEIRP/spatial range FIG. 3 is an illustration of a beam coverage area with maximum power control in a spatial range according to at least one example embodiment. In the example of FIG. 3, there are two base stations. As shown in FIG. 3, the beam coverage area includes a protected device 305, a first base station 310, a second base station 315 and a SAS 320. For example, the protected device 305 can be a base station, an FSS, a military radar, and/or the like and the base station 310, 315 can be a CBSD. The protected device 305 can have a coverage area 325. The base station 310 can have a steering range 330 and the base station 315 can have a steering range 335. The steering range 330, 335 can be a full steering range.

The base station 310, 315 (and other base stations not shown) can be interfering with the protected device 305. For example, spatial range 340 can be the interfering spatial range that has an angle $\theta_A$ and the spatial range 345 can be the interfering spatial range that has an angle $\theta_B$. The base station 310, 315 can be assigned a max EIRP level by the SAS 320. In an example implementation, the spatial range 340, 345 can be referred to as a spatial range for EIRP control. Although FIG. 3 illustrates a single spatial range with EIRP control per base station 310, 315, a plurality (e.g., two or more) spatial ranges with EIRP control can exist. Each of the spatial ranges with EIRP control can have a max EIRP level that is the same as or different from the max EIRP level of other spatial ranges with EIRP control.

For example, the base station 310 can be assigned a max EIRP level 350 (sometimes referred to herein as $P_A$) at which a signal (e.g., associated with at least one beam) generated by the base station 310 can interfere with the protected device 305. Therefore, the base station 310 can also be assigned a max EIRP level 355 (sometimes referred to herein as $P_B$) at which a signal generated by the base station 310 does not interfere with the protected device 305. Further, the base station 315 can be assigned a max EIRP level 360 (sometimes referred to herein as $P_A$) at which a signal (e.g., associated with at least one beam) generated by the base station 315 can interfere with the protected device 305. Therefore, the base station 315 can also be assigned a max EIRP level 365 (sometimes referred to herein as $P_B$) at which a signal generated by the base station 315 does not interfere with the protected device 305.

In an example implementation, a Spectrum Access System (SAS) (e.g., SAS 320) can be configured to manage the max EIRP that bases station(s) (e.g., base station 310, 315) can transmit in the base stations interfering (e.g., spatial range 340, 345) and non-interfering spatial ranges, respectively. Example implementations can implement the following interactions between the base stations and the SAS to support spatial dimension based max EIRP control in order to minimize the interference to a protected device (e.g., protected device 305). Initially, installation parameters for the base stations (e.g., base station 310, 315) can be known (e.g., stored in a memory) to the SAS (e.g., SAS 320). Such parameters may include geographical location and the orientation of the base stations. The SAS can also have knowledge (e.g., stored in a memory) of the geographical locations and the coverage area of the protected device (e.g., protected device 305). The SAS (e.g., as a SAS server) can determine (e.g., calculate) the interfering spatial range for each the base stations, shown in FIG. 3 as OA and OB, respectively. After OA and OB are subtracted out of their respective full steering range, the remaining range is the non-interfering spatial range.

During a Coordinated Periodic Activates among SASes (CPAS) window, the SAS server can evaluate grant requests from the base stations and determine the max EIRP for each grant within their respective interfering spatial range such that the aggregate interference received by the protected device passes a criterion (e.g., is below a certain allowable threshold). In addition, the SAS can determine the max EIRP for each grant within their respective non-interfering spatial range such that the intra base station interference (e.g., the interference between base station 310 and base station 315) passes a criterion (e.g., is below a certain allowable threshold).

The max EIRP grant from SAS to the base station can define a max EIRP envelope. To support spatial range based max EIRP control, the existing maxEirp field can be extended to include one or more spatial range—maxEirp pairs, with each pair defining the spatial boundary in angles and max EIRP allowed between angles.

Figure 4A:
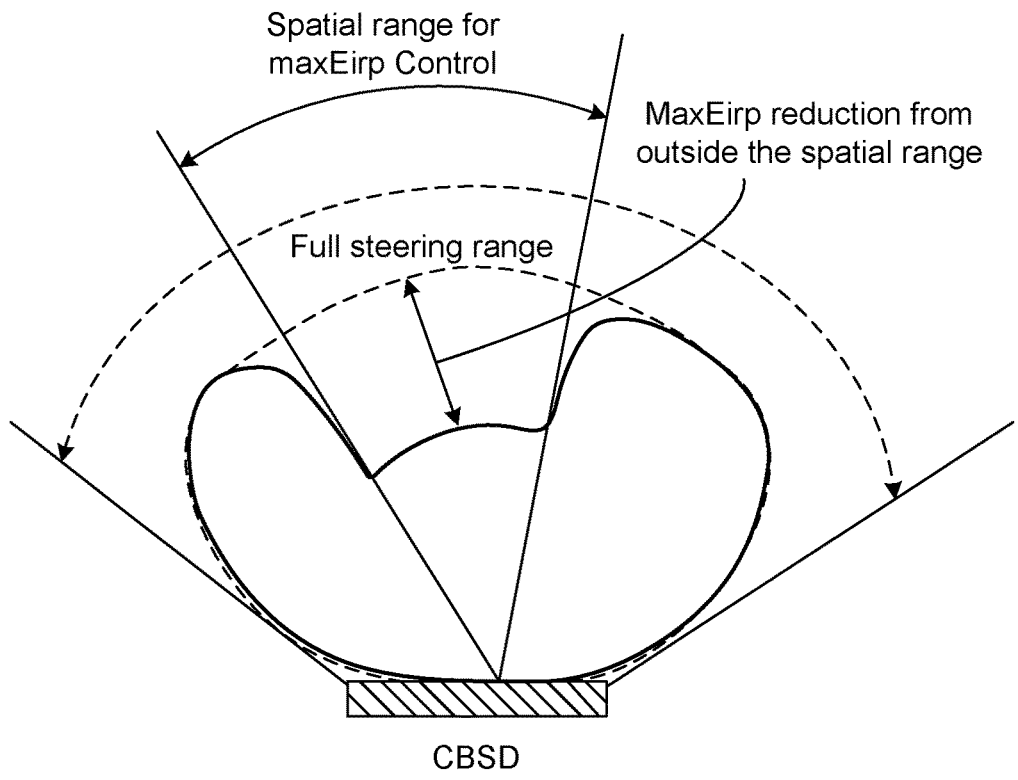
FIG. 4A is an illustration of a radiation envelope according to at least one example embodiment.

The grant can support beam attenuation as well as beam muting. The grant can divide the full steering range into interfering ranges and non-interfering ranges. The max EIRP within the interfering spatial range may be lower than that of the non-interfering spatial range. An exemplary radiation pattern for the grant is shown in FIG. 4A.

The combined signal from all base stations in their interfering spatial range can make up the total or aggregate interference observed by the protected device. This total or aggregate interference should be kept at or below a certain level to ensure the quality operation of the protected device. It is perceivable that, with the fixed combined power headroom, as more base stations request a grant, the share of the power budget for each base station may be divided further, resulting in a smaller max EIRP grant. Normally, a base station will use the grant with the specified max EIRP setting in the grant for transmission in the interfering and non-interfering spatial ranges.

Figure 4B:
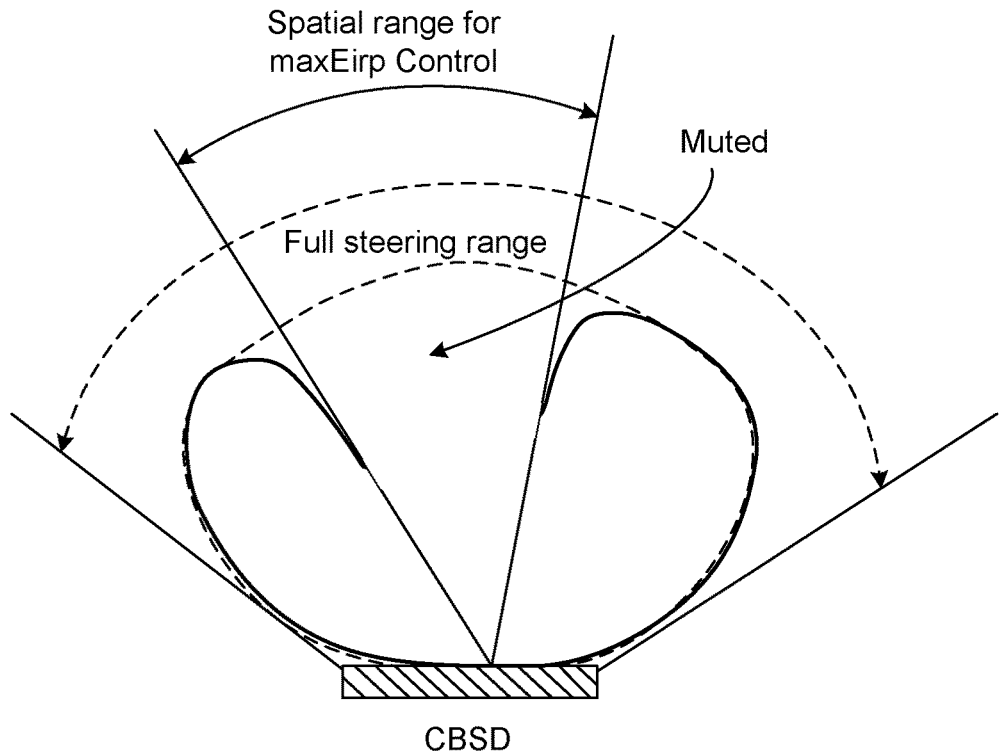
FIG. 4B is an illustration of a radiation envelope according to at least one example embodiment.

Should a base station receive a max EIRP grant at a level that is lower than its minimum transmit power, the base station will mute the beams in the interfering spatial range with a radiation envelope as illustrated in FIG. 4B. In the next CPAS window, the SAS can continue to evaluate the grant from each base station. Accordingly, the base station that muted the beams in a spatial range in the previous cycle may be assigned a higher max EIRP value and transition to the grant and may be able to transmit using attenuated beams.

FIGS. 5, 6, 7, and 8 are flowcharts of methods according to example embodiments. The methods described with regard to FIGS. 5, 6, 7, and 8 may be performed due to the execution of software code stored in a memory (e.g., a non-transitory computer readable storage medium) associated with an apparatus (e.g., base station 310, 315 and/or SAS 320) and executed by at least one processor associated with the apparatus. The software code can be configured to implement the techniques described herein. However, alternative embodiments are contemplated such as a system embodied as a special purpose processor. Although the methods described below are described as being executed by a processor and/or a special purpose processor, the methods are not necessarily executed by a same processor. In other words, at least one processor and/or at least one special purpose processor may execute the method described below with regard to FIGS. 5, 6, 7, and 8.

Figure 5:
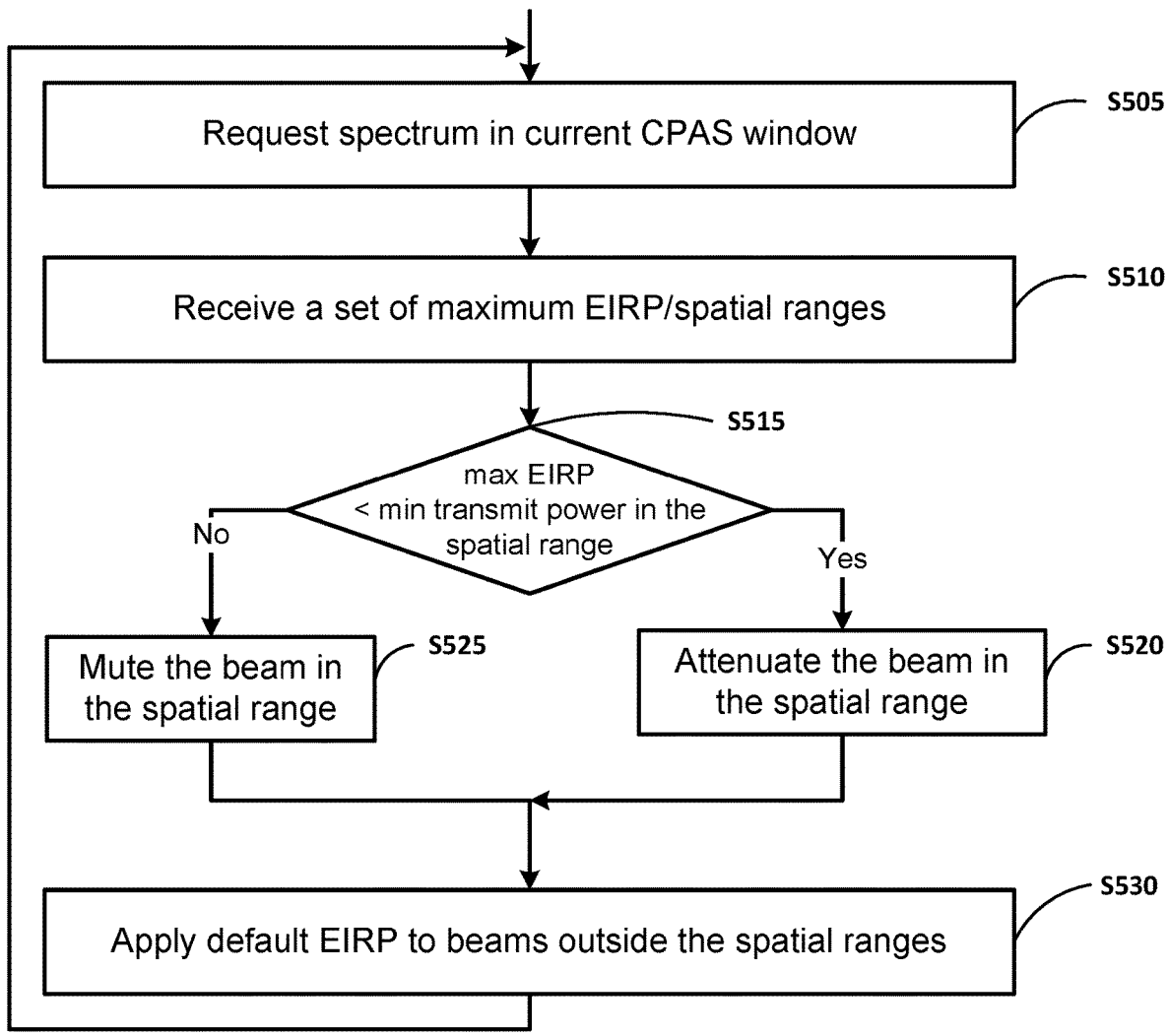
FIG. 5 illustrates a block diagram of a method for beam power assignment according to at least one example implementation.

FIG. 5 illustrates a flowchart of a method for beam power assignment according to at least one example implementation. As shown in FIG. 5, in step S505 spectrum is requested, or a spectrum inquiry is received or modification of CBSDs operational parameters is required as per the outcome of CPAS window. For example, a base station (or other device configured to generate a beam) can be communicatively coupled to a network device (e.g., an SAS). The base station can communicate a message to the network device. The message can include a spectrum request (e.g., frequency, beam transmission power, and/or the like).

In step S510 a set of maximum EIRP/spatial ranges is received. For example, in response to the spectrum request, the network device can communicate a message to the base station. The message can include, at least, at least one EIRP and at least one spatial range. In an example implementation, the at least one EIRP can be associated with the at least one spatial range. In an example implementation, the at least one EIRP can be associated with a spatial range not including the at least one spatial range. The spatial range can be an interfering spatial range and/or a non-interfering spatial range. In an example implementation, the EIRP for a non-interfering spatial range can be greater than the EIRP for an interfering spatial range. There can be at least one and/or a plurality of non-interfering spatial ranges and/or interfering spatial ranges in a full steering range.

In step S515 determine whether the max EIRP is less than a minimum transmit power in the spatial range. For example, the base station can have a minimum transmission power (e.g., beam transmission power). The base station can be configured to determine if the max EIRP is less than the minimum transmission power of the base station.

In step S520 in response to determining the max EIRP is not less than the minimum transmit power in the spatial range, the beam in the spatial range is attenuated. For example, the beam (or beams) associated with the spatial range can be attenuated from transmitting at first power (e.g., a default EIRP, one of the set of maximum EIRP, and/or the like) to transmitting at a second power (e.g., an EIRP associated with the spatial range).

In step S525 in response to determining the max EIRP is less than a minimum transmit power in the spatial range, the beam(s) in the spatial range is muted. For example, the beam (or beams) associated with the spatial range can be muted (e.g., turned off, set to transmit at a power of zero (0), and/or the like) from transmitting at first power (e.g., a default EIRP, one of the set of maximum EIRP, and/or the like). The muted beam(s) for a spatial range (e.g., an interfering spatial range) can be unmuted in response to receiving another EIRP for the spatial range that is greater than or equal to the minimum transmit power.

In step S530 a default EIRP is applied to beams outside the spatial ranges. For example, the beam (or beams) associated with a spatial range that does not include the spatial range can transmit at default power (e.g., a default EIRP, one of the set of maximum EIRP, and/or the like). Processing returns to step S505.

Figure 6:
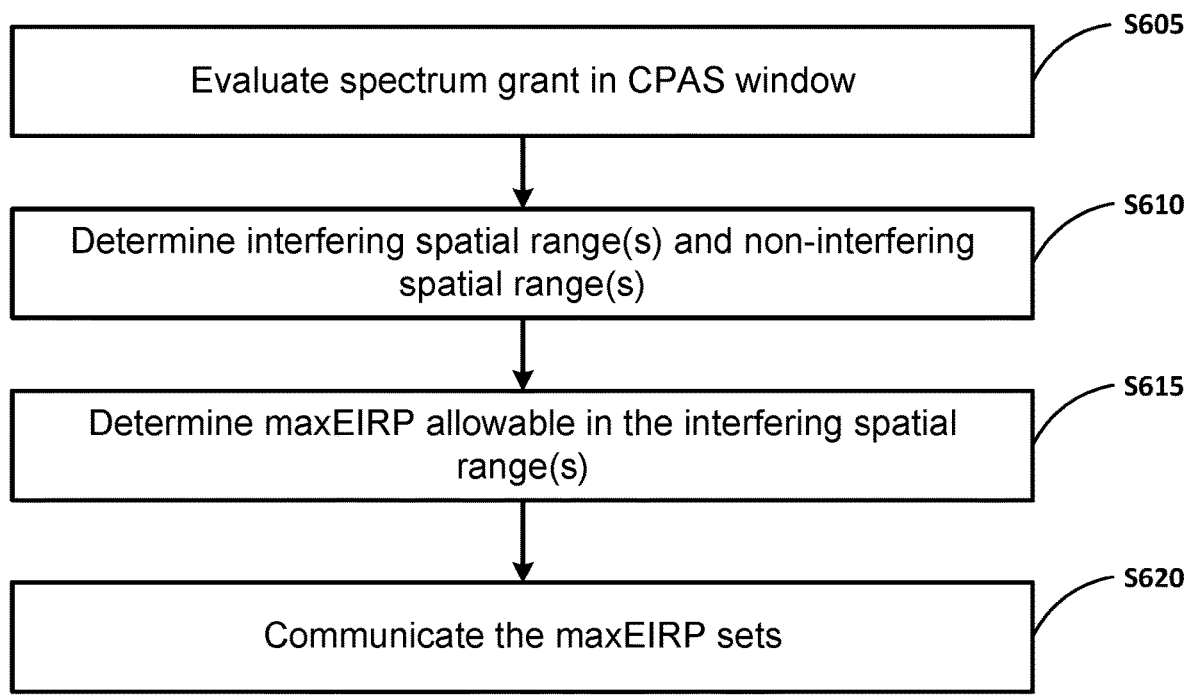
FIG. 6 illustrates a block diagram of a method for determining beam power according to at least one example implementation.

FIG. 6 illustrates a flowchart of a method for determining beam power according to at least one example implementation. As shown in FIG. 6, in step S605 a spectrum grant is evaluated in a CPAS window. For example, a base station (or some other device configured to generate a beam) can be communicatively coupled to a network device (e.g., an SAS). Spectrum for the base station can be requested and granted in regular time intervals (e.g., once per day, every six (6) hours, every 12 hours, and/or the like). This regular time interval can be a CPAS window. Therefore, the network device can receive a message from the base station. The message can include a spectrum request at a time corresponding to the CPAS window. The spectrum can be granted and evaluated (e.g., to ensure an interference budget is not exceeded). The network device can receive, grant and evaluate a plurality of spectrum requests from a plurality of base stations.

In step S610 interfering spatial range(s) and non-interfering spatial range(s) are determined. For example, the network device can have information associated with at least one protected device stored in a memory of the network device. The information can include a coverage area (e.g., a geographic area) associated with the at least one protected device. An interfering spatial range can be a spatial range including beams that, if transmitted at a determined power, can interfere with the operation (e.g., add noise to signals generated by) the protected device. A non-interfering spatial range can be a spatial range including beams that, if transmitted at a determined power, do not interfere (or substantially interfere) with the operation (e.g., add noise to signals generated by) the protected device. The network device can determine interfering spatial range(s) and non-interfering spatial range(s) are associated with a plurality of base stations and a plurality of protected devices. The interfering spatial range and/or the non-interfering spatial range can be two or more spatial ranges in a full steering range In step S615 a maxEIRP allowable in the interfering spatial range(s) is determined. For example, each protected device can have an interference budget, an acceptable interference criterion, an interface threshold, and/or the like. The interference budget can be an aggregate amount of interference associated with at least one (likely two or more) base station. Therefore, the network device (e.g., SAS) can be configured to calculate, estimate, determine, and/or the like the aggregate amount of interference associated with at least one base station in the interfering spatial range(s). The network device can be configured to determine if the aggregate amount of interference, for example, exceeds the interference budget. If the aggregate amount of interference exceeds the interference budget, the network device can be configured to determine (or calculate, estimate, and/or the like) a reduced power (e.g., EIRP) in the spatial range(s) for each of the at least one base stations such that aggregate amount of interference does not exceed the interference budget. The reduced power can be the maxEIRP for (e.g., associated with) a base station and interfering spatial range. The network device can generate maxEIRP/spatial range sets using the reduced power.

In step S620 the maxEIRP sets are communicated. For example, a message can be communicated from the network device to the base station (e.g., at least one base station). The message can include the maxEIRP/spatial range sets.

Figure 7:
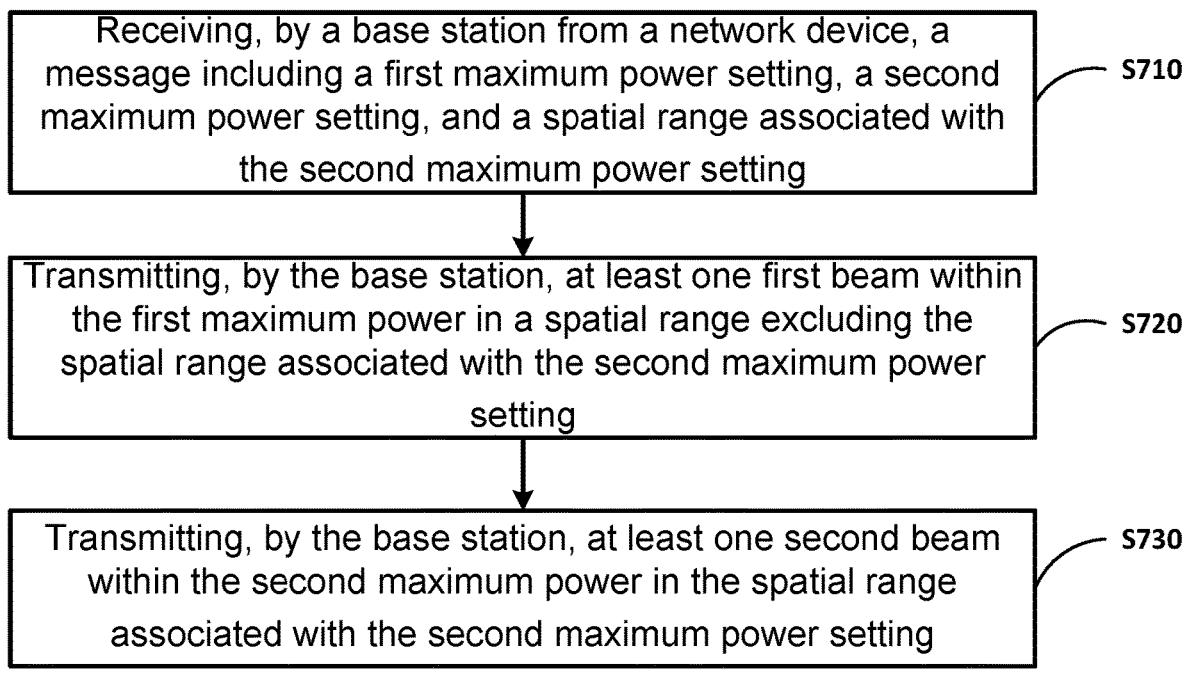
FIG. 7 illustrates a block diagram of a method for beam power assignment according to at least one example implementation.

Example 1. FIG. 7 is a flowchart illustrating operation of a base station. Operation S710 includes receiving, by a base station from a network device, a message including a first maximum power setting, a second maximum power setting, and a spatial range associated with the second maximum power setting. Operation S720 includes transmitting, by the base station, at least one first beam within the first maximum power in a spatial range excluding the spatial range associated with the second maximum power setting. Operation S730 includes transmitting, by the base station, at least one second beam within the second maximum power in the spatial range associated with the second maximum power setting.

Example 2. The method of Example 1, wherein the spatial range associated with the second maximum power setting is an interfering spatial range and the spatial range excluding the second maximum power setting is a non-interfering spatial range.

Example 3. The method of Example 1 and Example 2, further comprising communicating, by the base station, a spectrum request to the network device.

Example 4. The method of Example 1 to Example 3, further comprising determining whether the second maximum power setting is less than a minimum power setting; and in response to determining the second maximum power setting is less than the minimum power setting, muting the at least one second beam within the spatial range associated with the second maximum power setting.

Example 5. The method of Example 4, wherein the message is a first message, the method further comprising receiving a second message including the first maximum power setting, and an additional maximum power setting for the spatial range associated with the second maximum power setting; determining whether the additional maximum power setting is greater than a minimum power setting; and in response to determining the additional maximum power setting is greater than the minimum power setting, unmuting the at least one second beam, and transmitting the at least one second beam within the additional maximum power in the spatial range associated with the second maximum power setting.

Example 6. The method of Example 1 to Example 5, wherein the first maximum power setting is greater than the second power setting.

Example 7. The method of Example 1 to Example 6, wherein the spatial range associated with the second maximum power setting includes two or more spatial ranges in a full steering range.

Example 8. The method of Example 1 to Example 7, wherein the at least one first beam and the at least one second beam are transmitted in at least one of a shared access frequency bands, such as 6 GHz with Automated Frequency Coordination (AFC), and Citizens Broadband Radio Service (CBRS). Shared access frequency band can be frequency bands that have original owners (incumbent) but are now licensed out the base stations on condition that the incumbents' operation is not impacted). CBRS at 3.5 GHz is one example of shared access bands, AFC (Automated Frequency Coordination) at 6 GHz is another example of a shared access band. The Federal Communication Commission (FCC) plans to release more frequency bands that are owned by the government to allow them to have shared access. This disclosure is not limited to the CBRS band. The techniques described herein are applicable to other shared access bands.

Example 9. The method of Example 1 to Example 8, wherein the network device is a frequency allocation arbitrator or coordinator device.

Example 10. The method of Example 1 to Example 9, wherein the spatial range associated with the second maximum power setting is associated with a signal interference with a protected device.

Example 11. The method of Example 10, wherein the protected device has a higher priority than the first base station.

Example 12. The method of Example 10, wherein the protected device is at least one of a base station, a fixed microwave station, a radio astronomy station and, a fixed satellite station (FSS) base station, and a transmitter/receiver operating within or in proximity of a frequency band that is shared with the protected device.

Example 13. The method of Example 10 to Example 12, wherein the second maximum power setting is configured to keep the signal interference below a threshold that does not cause interference to the protected device.

Example 14. The method of Example 1 to Example 13, wherein the second maximum power setting includes two or more power settings, and the spatial range associated with the second maximum power setting includes two or more spatial ranges.

Example 15. The method of Example 1 to Example 14, wherein the spatial range associated with the second maximum power setting is no more than a full steering range.

Example 16. The method of Example 1 to Example 14 wherein the receiving of the message occurs one of during active use of a channel, during inquiry on available channels, or during request of usage of the channel.

Figure 8:
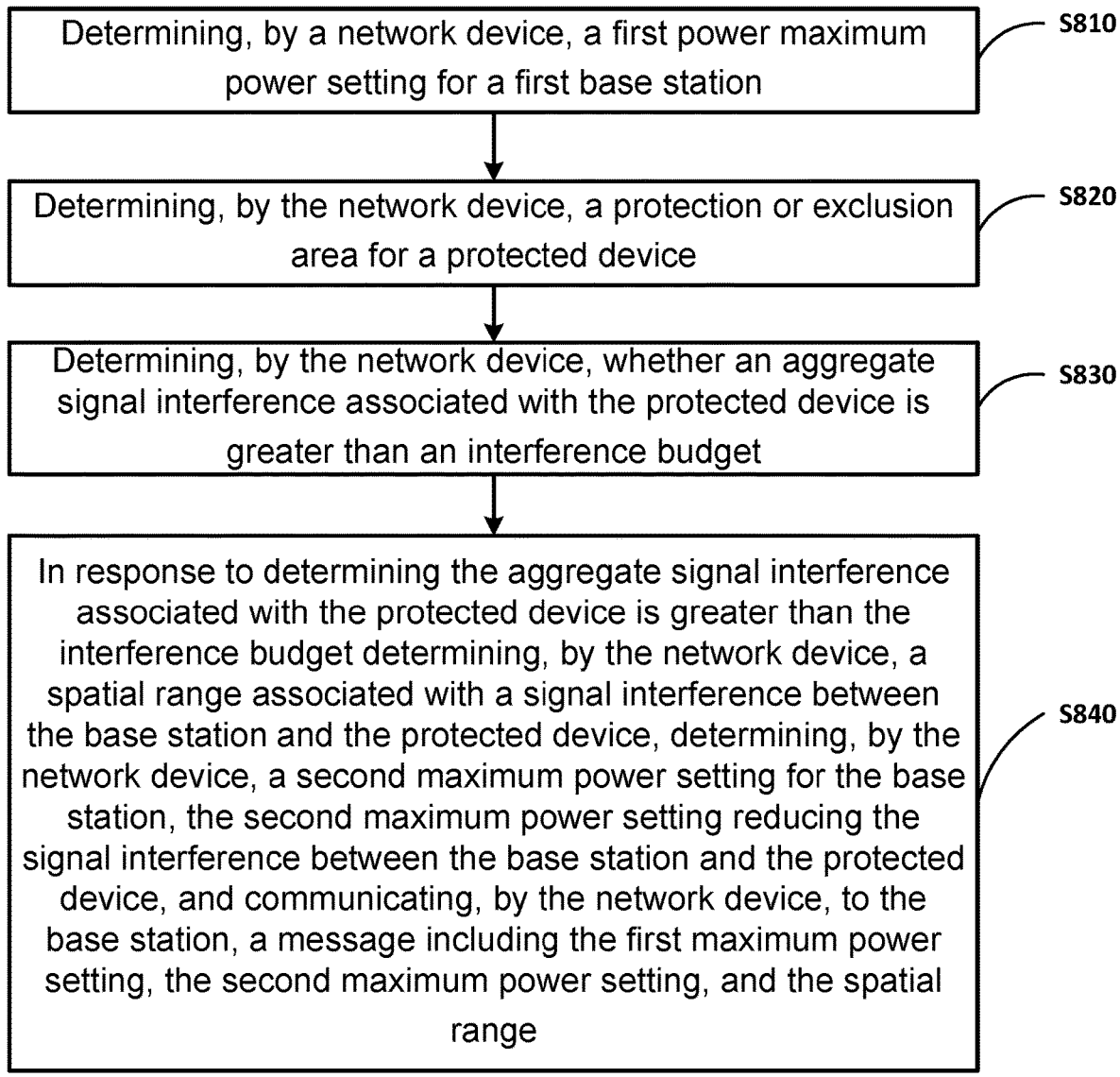
FIG. 8 illustrates a block diagram of a method for determining beam power according to at least one example implementation.

Example 17. FIG. 8 is a flowchart illustrating operation of a network device. Operation 810 includes determining, by a network device, a first power maximum power setting for a first base station. Operation 820 includes determining, by the network device, a protection or exclusion area for a protected device. Operation 830 includes determining, by the network device, whether an aggregate signal interference associated with the protected device is greater than an interference budget. Operation 840 includes in response to determining the aggregate signal interference associated with the protected device is greater than the interference budget determining, by the network device, a spatial range associated with a signal interference between the base station and the protected device, determining, by the network device, a second maximum power setting for the base station, the second maximum power setting reducing the signal interference between the base station and the protected device, and communicating, by the network device, to the base station, a message including the first maximum power setting, the second maximum power setting, and the spatial range.

Example 18. The method of Example 17, further comprising in response to determining the aggregate signal interference associated with the protected device is less than the interference budget, communicating, by the network device, to the base station, a message including the first maximum power setting, the second power setting and a spatial range associated with the second power setting.

Example 19. The method of Example 17 and Example 18, further comprising receiving, by the network device, a message including a spectrum request from the base station, wherein the receiving of the message occurs one of during active use of a channel, during inquiry on available channels, or during request of usage of the channel.

Example 20. The method of Example 17 to Example 19, wherein the first maximum power setting is greater than the second power setting.

Example 21. The method of Example 17 to Example 20, wherein the spatial range includes two or more spatial ranges in a full steering range.

Example 22. The method of Example 17 to Example 21, wherein the second maximum power setting includes two or more power settings and the spatial range includes two or more spatial ranges.

Example 23. The method of Example 17 to Example 22, wherein the network device is a frequency allocation arbitrator or coordinator device.

Example 24. The method of Example 17 to Example 23, wherein the protected device has a higher priority than the base station.

Example 25. The method of Example 17 to Example 24, wherein the second maximum power setting is configured to keep the signal interference below a threshold.

Example 26. The method of Example 25, wherein the threshold is associated aggregate interference associated with all base stations within a range of the protected device.

Example 27. The method of Example 17 to Example 26, wherein the spatial range is no more than a full steering range.

Example 28. The method of Example 17 to Example 27, wherein the method is performed in a fixed time window.

Figure 9:
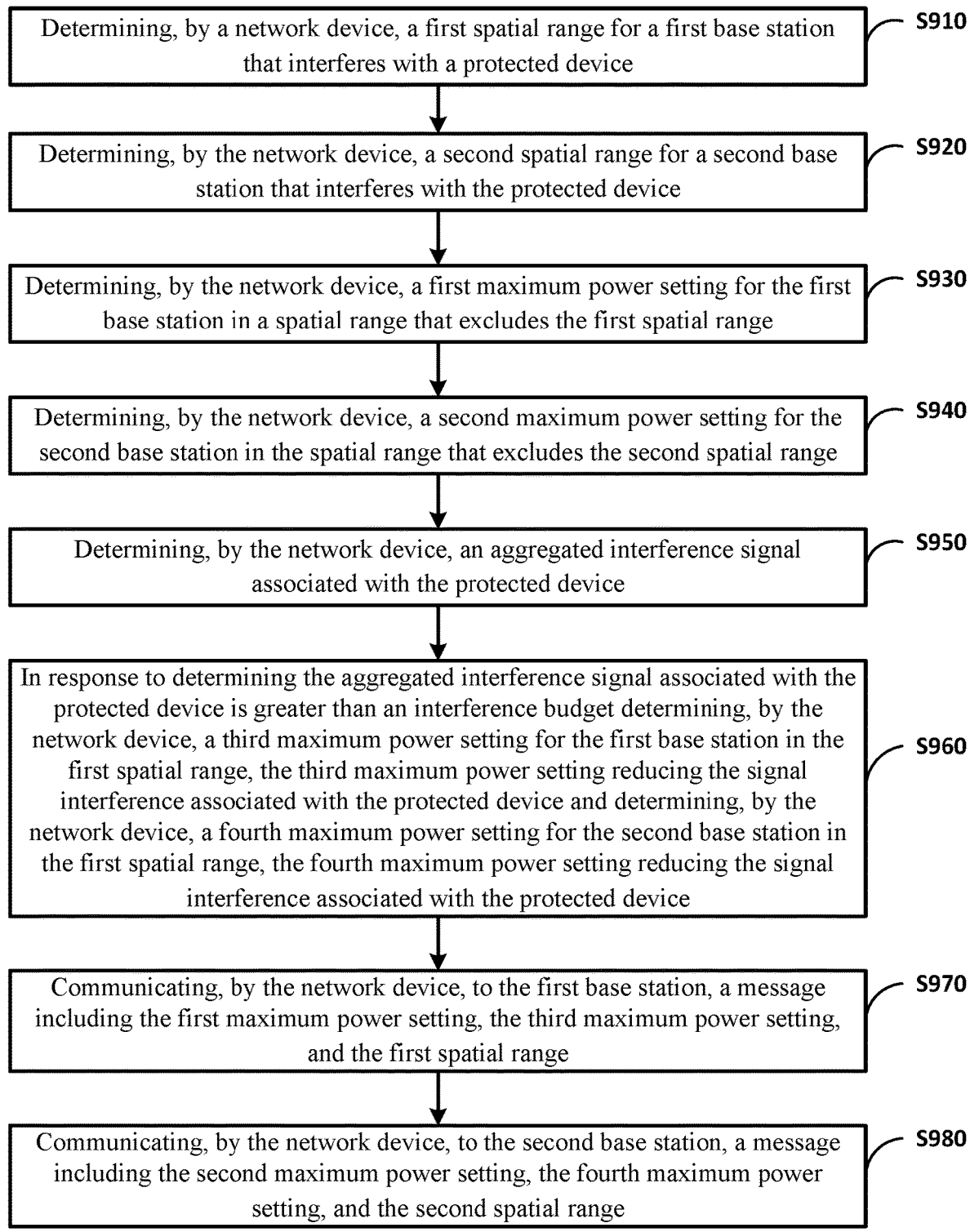
FIG. 9 illustrates a block diagram of a method for determining beam power according to at least one example implementation.

Example 29. FIG. 9 is a flowchart illustrating operation of a network device. Operation 910 includes determining, by a network device, a first spatial range for a first base station that interferes with a protected device. Operation 920 includes determining, by the network device, a second spatial range for a second base station that interferes with the protected device. Operation 930 includes determining, by the network device, a first maximum power setting for the first base station in a spatial range that excludes the first spatial range. Operation 940 includes determining, by the network device, a second maximum power setting for the second base station in the spatial range that excludes the second spatial range. Operation 950 includes determining, by the network device, an aggregated interference signal associated with the protected device. Operation 960 includes in response to determining the aggregated interference signal associated with the protected device is greater than an interference budget determining, by the network device, a third maximum power setting for the first base station in the first spatial range, the third maximum power setting reducing the signal interference associated with the protected device and determining, by the network device, a fourth maximum power setting for the second base station in the first spatial range, the fourth maximum power setting reducing the signal interference associated with the protected device. Operation 970 includes communicating, by the network device, to the first base station, a message including the first maximum power setting, the third maximum power setting, and the first spatial range. Operation 980 includes communicating, by the network device, to the second base station, a message including the second maximum power setting, the fourth maximum power setting, and the second spatial range.

Example 30. The method of claim Example 29, further comprising in response to determining the aggregate signal interference associated with the protected device is less than the interference budget, communicating, by the network device, to the base station, a message including the first maximum power setting.

Example 31. The method of Example 29 and Example 30, further comprising receiving, by the network device, a message including a spectrum request from the base station, wherein the receiving of the message occurs one of during active use of a channel, during inquiry on available channels, or during request of usage of the channel.

Example 32. The method of Example 29 to Example 31, wherein the first maximum power setting is greater than the second power setting.

Example 33. The method of Example 29 to Example 32, wherein the spatial range includes two or more spatial ranges in a full steering range.

Example 34. The method of Example 29 to Example 33, wherein the second maximum power setting includes two or more power settings and the spatial range includes two or more spatial ranges.

Example 35. The method of Example 29 to Example 34, wherein the first base station and the second base station operate in at least one of shared frequency bands, such as 6 GHz with Automated Frequency Coordination (AFC), and Citizens Broadband Radio Service (CBRS).

Example 36. The method of Example 29 to Example 35, wherein the network device is a frequency allocation arbitrator or coordinator device.

Example 37. The method of Example 29 to Example 36, wherein the protected device has a higher priority than the base station.

Example 38. The method of Example 29 to Example 37, wherein the second maximum power setting is configured to keep the signal interference below a threshold.

Example 39. The method of claim Example 38, wherein the threshold is associated aggregate interference associated with all base stations within a range of the protected device.

Example 40. The method of Example 29 to Example 39, wherein the spatial range is no more than a full steering range.

Example 41. The method of Example 29 to Example 40, wherein the method is performed in a fixed time window.

Example 42. A non-transitory computer-readable storage medium comprising instructions stored thereon that, when executed by at least one processor, are configured to cause a computing system to perform the method of any of Examples 1-41.

Example 43. An apparatus comprising means for performing the method of any of Examples 1-41.

Example 44. An apparatus comprising: at least one processor; and at least one memory including computer program code; the at least one memory and the computer program code configured to, with the at least one processor, cause the apparatus at least to perform the method of any of Examples 1-41.

Figure 10:
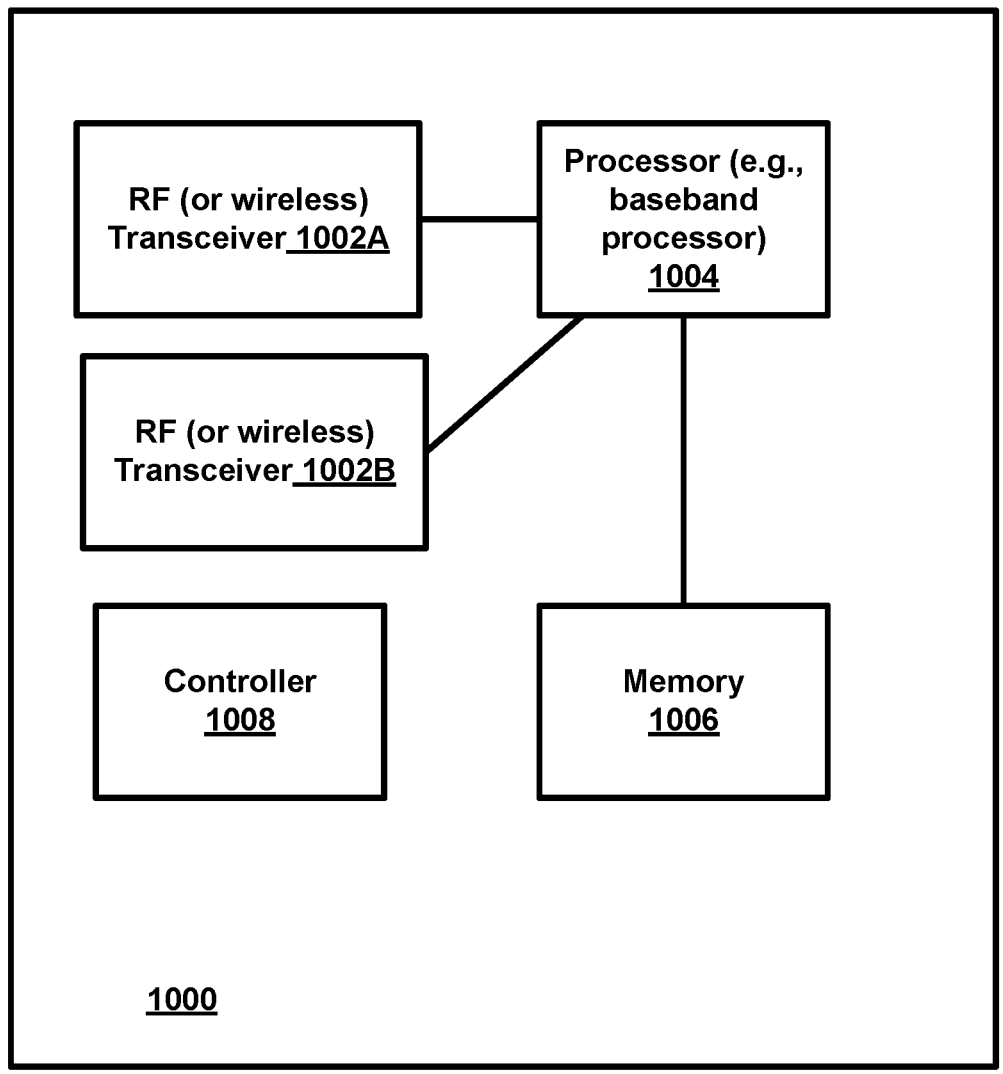
FIG. 10 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 10 is a block diagram of a wireless station 1000 or wireless node or network node 1000 according to an example embodiment. The wireless node or wireless station or network node 1000 may include, e.g., one or more of an AP, BS, gNB, RAN node, relay node, UE or user device, network node, network entity, DU, CU-CP, CU-CP, . . . or other node) according to an example embodiment.

The wireless station 1000 may include, for example, one or more (e.g., two as shown in FIG. 10) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a base station from a network device, a message including a first maximum power setting, a second maximum power setting, and a spatial range associated with the second maximum power setting;
   transmitting, by the base station, at least one first beam within the first maximum power in a spatial range excluding the spatial range associated with the second maximum power setting; and
   transmitting, by the base station, at least one second beam within the second maximum power in the spatial range associated with the second maximum power setting.

2. The method of claim 1, wherein the spatial range associated with the second maximum power setting is an interfering spatial range and the spatial range excluding the second maximum power setting is a non-interfering spatial range.

3. The method of claim 1, further comprising:
   determining whether the second maximum power setting is less than a minimum power setting; and
   in response to determining the second maximum power setting is less than the minimum power setting, muting the at least one second beam within the spatial range associated with the second maximum power setting.

4. The method of claim 3, wherein the message is a first message, the method further comprising:
   receiving a second message including the first maximum power setting, and an additional maximum power setting for the spatial range associated with the second maximum power setting;
   determining whether the additional maximum power setting is greater than a minimum power setting; and
   in response to determining the additional maximum power setting is greater than the minimum power setting,
      unmuting the at least one second beam, and
      transmitting the at least one second beam within the additional maximum power in the spatial range associated with the second maximum power setting.

5. The method of claim 1, wherein the spatial range associated with the second maximum power setting includes two or more spatial ranges in a full steering range.

6. The method of claim 1, wherein the at least one first beam and the at least one second beam are transmitted in at least one of shared access frequency bands, such as 6 GHz with Automated Frequency Coordination (AFC), and Citizens Broadband Radio Service (CBRS).

7. The method of claim 1, wherein
   the spatial range associated with the second maximum power setting is associated with a signal interference with a protected device.

8. The method of claim 7, wherein the protected device is at least one of a base station, a fixed microwave station, a radio astronomy station, a fixed satellite station (FSS) base station, and a transmitter/receiver operating within or in proximity of a frequency band that is shared with the protected device.

9. The method of claim 1, wherein the second maximum power setting is configured to keep a signal interference below a threshold that does not cause interference to a protected device.

10. The method of claim 1, wherein
    the second maximum power setting includes two or more power settings, and
    the spatial range associated with the second maximum power setting includes two or more spatial ranges.

11. The method of claim 1, wherein the spatial range associated with the second maximum power setting is no more than a full steering range.

12. The method of claim 1, wherein the receiving of the message occurs one of during active use of a channel, during inquiry on available channels, or during request of usage of the channel.

13. A method comprising:
    determining, by a network device, a first power maximum power setting for a first base station;
    determining, by the network device, a protection or exclusion area for a protected device;
    determining, by the network device, whether an aggregate signal interference associated with the protected device is greater than an interference budget; and
    in response to determining the aggregate signal interference associated with the protected device is greater than the interference budget,
       determining, by the network device, a spatial range associated with a signal interference between the base station and the protected device,
       determining, by the network device, a second maximum power setting for the base station, the second maximum power setting reducing the signal interference between the base station and the protected device, and
       communicating, by the network device, to the base station, a message including the first maximum power setting, the second maximum power setting, and the spatial range.

14. The method of claim 13, further comprising
    in response to determining the aggregate signal interference associated with the protected device is less than the interference budget, communicating, by the network device, to the base station, a message including the first maximum power setting, the second power setting and a spatial range associated with the second power setting.

15. The method of claim 13, wherein the spatial range includes two or more spatial ranges in a full steering range.

16. The method of claim 13, wherein
the second maximum power setting includes two or more power settings, and
the spatial range includes two or more spatial ranges.

17. The method of claim 13, wherein the network device is a frequency allocation arbitrator or coordinator device.

18. The method of claim 13, wherein the second maximum power setting is configured to keep the signal interference below a threshold.

19. The method of claim 18, wherein the threshold is associated aggregate interference associated with all base stations within a range of the protected device.

20. The method of claim 13, wherein the spatial range is no more than a full steering range.

21. A method comprising:
determining, by a network device, a first spatial range for a first base station that interferes with a protected device;
determining, by the network device, a second spatial range for a second base station that interferes with the protected device;
determining, by the network device, a first maximum power setting for the first base station in a spatial range that excludes the first spatial range;
determining, by the network device, a second maximum power setting for the second base station in a spatial range that excludes the second spatial range;
determining, by the network device, an aggregated interference signal associated with the protected device;
in response to determining the aggregated interference signal associated with the protected device is greater than an interference budget,
determining, by the network device, a third maximum power setting for the first base station in the first spatial range, the third maximum power setting reducing the signal interference associated with the protected device, and
determining, by the network device, a fourth maximum power setting for the second base station in the second spatial range, the fourth maximum power setting reducing the signal interference associated with the protected device;
communicating, by the network device, to the first base station, a message including the first maximum power setting, the third maximum power setting, and the first spatial range; and
communicating, by the network device, to the second base station, a message including the second maximum power setting, the fourth maximum power setting, and the second spatial range.

22. The method of claim 21, further comprising
in response to determining the aggregate signal interference associated with the protected device is less than the interference budget, communicating, by the network device, to the base station, a message including the first maximum power setting.

23. The method of claim 21, further comprising receiving, by the network device, a message including a spectrum request from the base station, wherein the receiving of the message occurs one of during active use of a channel, during inquiry on available channels, or during request of usage of the channel.

24. The method of claim 21, wherein the spatial range includes two or more spatial ranges in a full steering range.

25. The method of claim 21, wherein
the second maximum power setting includes two or more power settings, and
the spatial range includes two or more spatial ranges.

26. The method of claim 21, wherein the network device is a frequency allocation arbitrator or coordinator device.

27. The method of claim 21, wherein the second maximum power setting is configured to keep the signal interference below a threshold.

28. The method of claim 27, wherein the threshold is associated aggregate interference associated with all base stations within a range of the protected device.

* * * * *